J. DAVIS, 2d.
Churn.
No. 59,790.                              Patented Nov. 20, 1866.
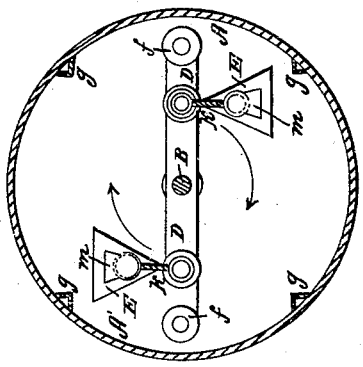
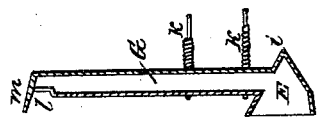
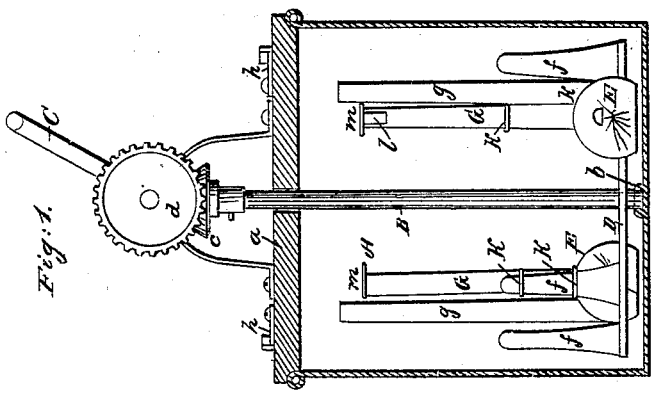
Witnesses:
S. Browne.
R. A. O'mille
Inventor:
John Davis 2nd,
By his atty,
J. S. Brown.

United States Patent Office.

IMPROVEMENT IN CHURNS.

JOHN DAVIS, 2d, OF LAKE VILLAGE, NEW HAMPSHIRE.

Letters Patent No. 59,790, dated November 20, 1866; antedated November 16, 1866.

SPECIFICATION.

TO ALL WHOM IT MAY CONCERN:

Be it known that I, JOHN DAVIS, 2d, of Lake Village, in the county of Belknap, and State of New Hampshire, have invented an improved Churn; and I do hereby declare that the following is a full and exact description thereof, reference being had to the accompanying drawings making part of this specification:

Figure 1 being a central vertical section of the churn.

Figure 2 a horizontal section thereof.

Figure 3 a central vertical section of the air-supplying agitators. Like letters designate corresponding parts in all of the figures.

The churn body A, may be of usual construction, properly of cylindrical form; and it is best to have ribs or cleats, $g\ g$, attached vertically to its inner periphery to cause greater agitation to the cream. A central vertical shaft B, driven by a crank C, and bevel gear $e\ d$, has beater arms D D projecting from it near the bottom of the churn body, and from these arms project vertically upward, round, tapering beater pins $f\ f$, substantially as represented. Upon two or more of these beater pins are mounted my conical agitators E E, so as to be pivotted thereon and follow in the path of their motion by means of the ring bearings $k\ k$, or their equivalent. These conical agitators are open at their large end or base, and are entirely closed at their apex $i$; and from their upper sides extends upward near the top of the churn a tube, G, opening into them, and having an aperture, $l$, at the upper end covered by an overhanging cap, $m$, substantially as shown in the drawings.

These conical agitators thus arranged, not only are well formed to produced intense agitation of the cream, but tend constantly to produce a vacuum in the cream by their apex going forward in the cream; and thus draw large quantities of air down through their tubes G, and mingle it with the cream, whereby the churning is greatly hastened and the quality of the butter improved. When the churn is to be cleaned, these agitators are removed and washed separately.

What I claim as my invention, and desire to secure by Letters Patent, is—

The hollow conical agitators E E, with their air-supplying tubes G G, arranged and operating substantially as and for the purpose herein specified.

The above specification of my improved churn signed by me, this twelfth day of April, 1866.

JOHN DAVIS, 2d.

Witnesses:
HUGH BLAISDELL,
FRANK J. ROBINSON.